United States Patent [19]

Wagner

[11] 4,224,716
[45] Sep. 30, 1980

[54] MOLDING DEVICE

[75] Inventor: Richard C. Wagner, Frankfort, Ill.

[73] Assignee: Hollymatic Corporation, Park Forest, Ill.

[21] Appl. No.: 29,721

[22] Filed: Apr. 13, 1979

[51] Int. Cl.³ .............................................. A22C 7/00
[52] U.S. Cl. ........................................ 17/32; 425/259
[58] Field of Search ............................. 425/259; 17/32

[56] References Cited

U.S. PATENT DOCUMENTS

| | | | |
|---|---|---|---|
| 3,203,037 | 8/1965 | Anhanger et al. | 17/32 |
| 3,964,127 | 6/1976 | Holly | 17/32 |
| 4,118,831 | 10/1978 | Holly et al. | 17/32 |
| 4,153,974 | 5/1979 | Holly et al. | 17/32 |

Primary Examiner—James H. Derrington

Attorney, Agent, or Firm—Wegner, Stellman, McCord, Wiles & Wood

[57] ABSTRACT

A molding device for molding food articles of raw finely divided beef and similar tissue containing food material that is normally subject to uneven shrinkage during cooking comprising supply means for the material, a mold having a mold opening including a peripheral arcuate edge, a supply passage means for supplying pressurized material to the mold opening from the supply passage, the supply passage having an arcuate exit end at the arcuate edge of the mold opening and this arcuate exit end including means for projecting the food material directly into the mold opening in a thin ribbon of a thickness that is only a fraction of the spacing between end surfaces defining the mold opening and the projecting being at an obtuse angle to an adjacent one of the end surfaces.

13 Claims, 5 Drawing Figures

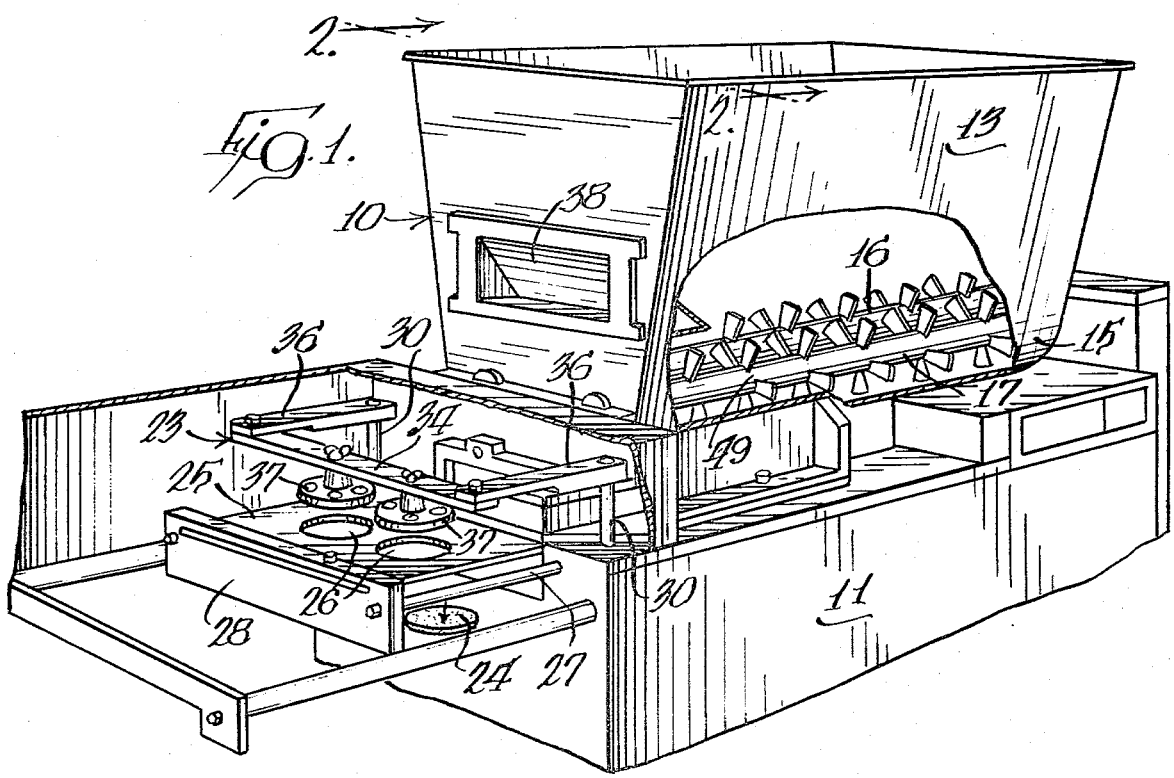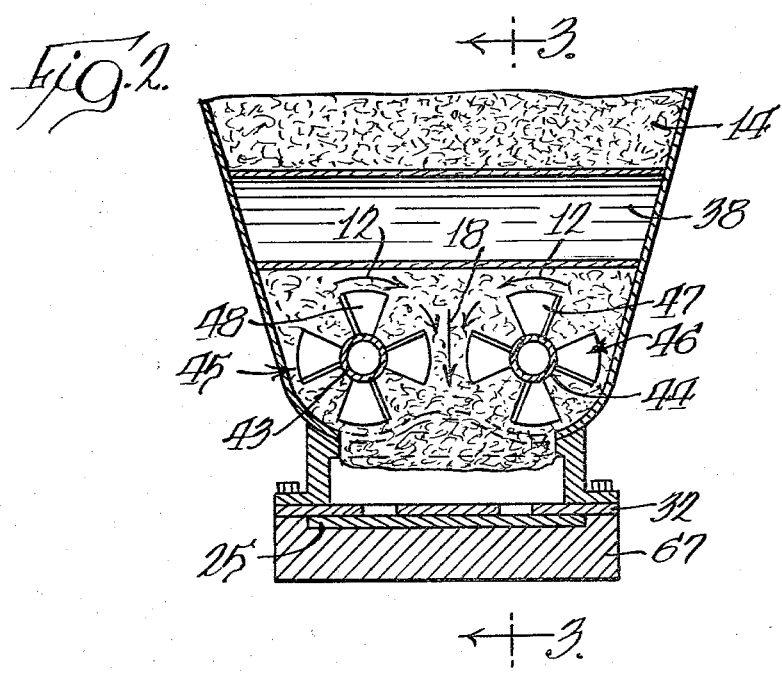

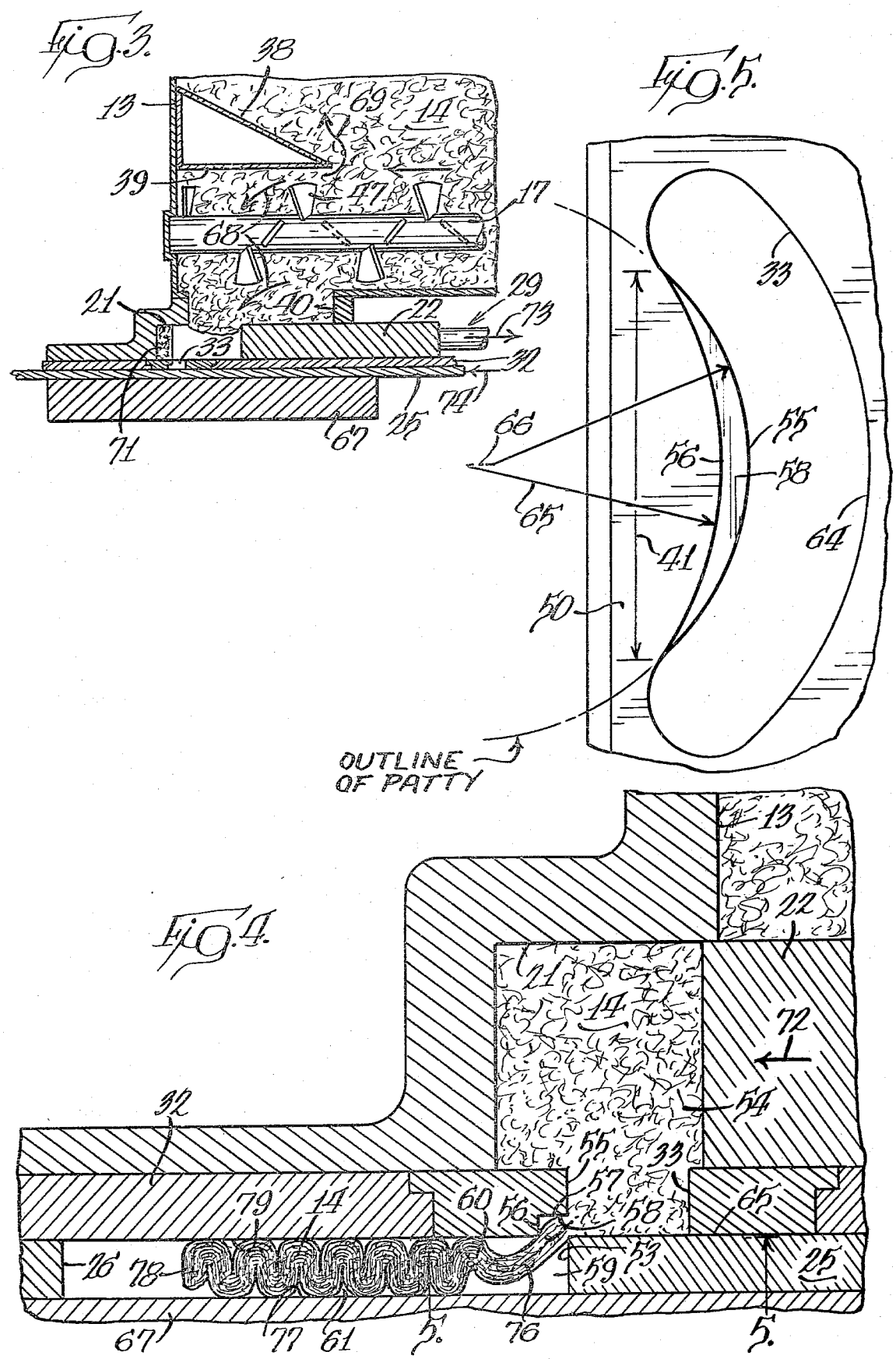

MOLDING DEVICE

BACKGROUND OF THE INVENTION

This invention relates to a food molding machine particularly for molding flat patties of ground raw beef and similar tissue containing material that tends to cook to a misshapen form which is believed to be caused by the tissues promoting uneven shrinkage of the patties during cooking.

Thus with many prior molding devices for molding food material of this type the raw patty itself has an attractive and uniform shape and appearance but upon cooking becomes misshapen because of the uneven shrinkage of the tissues of the meat. These problems are particularly acute with raw finely divided, such as ground, beef.

The present invention provides a simple machine or device for avoiding these difficulties in that the resulting patties of raw ground beef, for example, not only shrink substantially uniformly in all directions but also after cooking have almost the same dimensions in all directions as the molded article had before cooking. This means that the resulting cooked article such as the patty is larger than patties molded with prior machines and with the same amount of beef. In fact, experience has shown that larger coverage of the bun with the cooked patty can be obtained even when the patties molded in the devices of this machine contain less than the amount of meat required to give good bun coverage in patties formed by the prior art machines.

BRIEF DESCRIPTION OF THE DRAWINGS

FIG. 1 is a fragmentary perspective view partially broken away of a molding device embodying the invention.

FIG. 2 is a fragmentary sectional view taken substantially along line 2—2 of FIG. 1.

FIG. 3 is a fragmentary vertical sectional view taken substantially along line 3—3 of FIG. 2 showing the parts in one position during the molding cycle.

FIG. 4 is an enlarged fragmentry vertical section through the forward portion of the pressure chamber and surrounding structure during the filling of the mold opening with the food material which here is ground raw beef.

FIG. 5 is a horizontal sectional view taken substantially along line 5—5 of FIG. 4.

The device shown in the accompanying drawings is similar to the patty machine shown in Holly et al copending U.S. Pat. No. 4,153,974, issued May 15, 1979, and Wagner copending patent application Ser. No. 934,819, filed Aug. 18, 1978, now abandoned both applications being assigned to the assignee hereof.

DESCRIPTION OF THE PREFERRED EMBODIMENT

The molding device 10 comprises a cabinet 11 carrying at its top a hopper 13 for holding the material to be molded such as ground or otherwise finely divided food material and particularly ground raw beef 14 for molding the hamburger patties. Located within the hopper bottom 15 are a pair of parallel feed augers 16 and 17 that are rotated with their tops moving toward each other as indicated by the arrows 12 in FIG. 2 to feed the material down between them as indicated by the arrows 18.

Located beneath the forward ends of the hopper 13 and augers 16 and 17 is a pressure chamber 21 in which is reciprocated a pressure ram 22 as shown in FIG. 3. The molding device is provided with a reciprocable mold plate 25 for molding flat patties 24 from the finely divided material with the mold plate 25 having a pair of transversely arranged mold openings 26 each of circular configuration in this embodiment.

The mold plate 25 is driven in a horizontal plane between a retracted filling position as shown in FIG. 4 and a fully extended patty removal position as shown in FIG. 1. This driving mechanism which is customary includes parallel drive rods 27 that are connected at their forward ends to a vertical cross bar 28 to which the forward end of the multiple patty mold plate 25 is attached as shown in FIG. 1.

As shown in FIG. 3, the pressure ram 22 located in the pressure chamber 21 and which extends across the full width of the mold plate 25 to fill both mold openings 26 simultaneously is reciprocated by a horizontal drive bar 29.

The horizontally reciprocable pressure ram 22 is supported on top of a fill plate 32 that is provided with a pair of fill slots 33 each leading to a mold opening 26 when the mold plate is in filling position as shown in FIG. 4.

In order to remove the patties from the mold opening there is provided a knockout device 23 comprising parallel side bars 36 and a cross bar 34 on which are located a pair of knockout cups 37. The knockout device 23 is raised to the elevated position shown in FIG. 1 by a customary cam operated mechanism (not shown) that inludes the reciprocably mounted vertical side support rods 30. As stated, the knockout device 23 and the operating structure therefor are all conventional.

Within the hopper 13, at the front or left end as viewed in the drawings, there is provided an inwardly directed baffle 38 that has a flat bottom 39 at the front end and above the augers 16 and 17. As shown in FIG. 3 the baffle 38 is located immediately above the exit opening 40 at the forward end of the hopper 13 and with this opening 40 leading to the pressure chamber 21 in which the pressure ram 22 is reciprocable as previously explained.

The bottom 39 of the baffle 38 is spaced about 0.25 to 1 inch, with 0.75 inch being especially preferred, from the top of the screw of the augers with this spacing being dependent upon the character which is the flow property of the material being molded, the consistency, the size of the patties and other well known factors.

In this invention each auger 16 and 17 is rotated as indicated by the arrows 12 in FIG. 2 by a customary drive device (not shown). Each auger comprises its shaft 43 and 44 and a helically arranged screw 45 and 46 with one or both of these augers made up of spaced screw segments 47 and 48. The augers could be continuous if desired. Each set of segments 47 and 48 is attached to its shaft 16 and 17 along a helix 49 and each segment extends radially away from its shaft. The segments 47 and 48 are each of uniform width and are spaced from 40° to 120°, such as 80°, apart in the customary molding device of this invention. Each segment is 0.5 to 2 inches wide with parallel sides. A satisfactory width is 1.5 inches.

As can be seen in FIG. 5, each fill slot 33 in the replaceable fill slot plate 50 is arcuate when the mold opening 26, and the resulting patty 24, is circular. Thus each fill slot 33 functions as an arcuate exit end from the supply passage 54 with this fill slot being located at or close to the adjacent arcuate edge portion 53 of the mold opening 26 during the filling of this opening as illustrated in FIG. 4.

The supply passage exit end which is of course arcuate has in series an arcuate first extending portion 55 that generally coincides with the mold opening arcuate edge portion 53 in a vertical direction and an arcuate second extending portion 56. These portions 55 and 56 are offset by a right angled horizontal surface 57 so as to provide a step-wise passage 58 emptying directly into the mold opening 26 along an axis 59.

The result of the above construction appears to be that the meat flows as illustrated diagrammatically by the wave formation 60. The result of this is that the cut tissues of the meat 14 are randomly mixed and the accordion-like pleats of the wave formation 60 are believed to entrap pockets of air 61. The resulting patty 24 is more tender after being cooked, has greater bun coverage than the customary machine made patty even when less meat is used and shrinks less and more evenly in all directions during cooking. Thus the present invention goes a long way toward solving the same problems now solved by the invention of Holly U.S. Pat. No. 4,118,831, also assigned to the assignee hereof.

As can be seen in FIG. 5 each fill slot 33 has the forward first portion 55 and the rear edge 64 parallel to each other. In the preferred construction the arcuate first and second extending portions 55 and 56 that define with the top 65 of the mold plate 25 the flow passage 58 are preferably curved to the same radius 65 but with their centers of curvature displaced as shown by the space 66. This spacing is preferably about 0.04 to 0.08 times the diameter of the resulting patty 24. A practical value has been found to be about 0.06 times the diameter of the patty. The radius 65 itself is about 0.52 to 0.60 times the diameter of the patty with a practical value being found to be about 0.56 times this diameter. As can be seen from FIG. 5 the spacing 66 is along a line that is symmetrical to the fill slot 33 in that if the spacing 66 line were projected to intersect the arcuate slot 33 it would bisect symmetrically this slot. The longitudinal width 41 of the fill slot 33 is 0.7 to 0.9 times the diameter of the patty. A practical value is 0.83 times.

In FIG. 4 there is illustrated the operation of the patty formation with this operating being partially theoretical and partially proven. It is proven by the fact that the meat 14 does not go directly into the mold opening 26 as occurs in the ordinary patty machine but is first formed into a ribbon shown by the wave formation 60 and this ribbon is projected through the stepped passage 58 at an angle as illustrated by the entering ribbon 60 to produce the accordion-pleat effect shown in FIG. 4. Because the mold opening 26 is full of air and this ribbon of meat tends to intermingle with the air forming the above-described meat-air mixture and although most patty machines including the illustrated embodiment contain air breather facilities for venting some of this air (not shown in the illustrated embodiment), an appreciable portion of this air is retained in the waves 60 and the sealing of these waves between the top of the base plate 67 and the bottom of the fill plate 32 serves to entrap this portion of the air. Thus what appears to be an essential feature of the present invention is the positioning of the flow channel 58 formed by the stepped surfaces 56 and 57 above the mold plate 25 and thus above an edge portion 53 of the mold opening during filling.

In a practical application of the invention the mold opening 26 was 4.237 inches in diameter and 0.470 inch thick to produce an approximately 4 ounce ground beef patty. After the patties were cooked it was noted that the patty prepared in the present machine cooked to an area of 13.4 square inches. In contrast, a patty prepared in an ordinary machine without this invention, that is, with the meat projected directly into the mold opening and with all other parts of the machine exactly the same as that used to prove the unobvious results of this invention, the patty cooked to an area of only 11.1 square inches. In each of these tests the area of the uncooked patties were 14.1 square inches. Thus the patty of the present invention shrank only 4.95% in area while the ordinary patty which illustrates the prior art shrank 21.3% in cooking.

It is believed that the superior patties of the present invention are produced because this invention results in a more uniform flow of meat into the mold opening during the complete cycle whose completion is illustrated in FIG. 4. It is also believed that the prior art molding machines do not produce an even flow because as the mold plate is retracted into filling position the entrance of the meat into the mold opening in the mold plate is first very tiny and then opens as the mold plate is moved into its final filling position. This causes an unevenly filled patty and one in which the tissues do not sufficiently intermingle. This invention provides a more uniform flow because the flow passage 58 is narrow and provides a fixed resistance to the meat flow 60 into the mold opening.

Although the passages 58 as illustrated in FIG. 4 are in two right angled sections the effect is to direct the ribbon 76 of meat at an obtuse angle to the surface 77 defining the mold opening 26.

Observations have proven that this ribbon 76 of meat assumes a wave formation essentially as illustrated at 60 and that this wave is maintained until the advancinng forward portion 78 of meat reaches the opposite edge of the mold opening 26. This mold opening 26 is defined by the arcuate edge 53 and the spaced end surfaces 77 and 79. In the illustrated embodiment the mold opening end surface 77 is the adjacent surface of the base plate 67 while the end surface 79 is the adjacent surface of the fill plate 32. The members 67 and 32 act as confining members between which the mold plate 25 is reciprocated.

The operation of the illustrated embodiment is as follows.

The augers 16 and 17 which are rotated as illustrated at 12 in FIG. 2 force the meat toward the front end off the hopper 13 where the baffle 38 is located. The baffle bottom 39 which is located just above the auger or screw segments 47 causes the meat to be diverted downwardly through the exit opening 40 into the pressure chamber 21 as illustrated by the arrows 68. The baffle 38 serves to limit the maximum pressure exerted on the meat by the augers asonce a predetermined resistance to meat compression is achieved by the rotating augers a portion of the meat will escape around the baffle back into the hopper 13 as illustrated by the arrow 69. The meat in the pressure chamber 21 is compressed by the advancing ram 22 which in the position shown in FIG. 3 has already reached its forward compressing position leaving a mass of meat 71 at the forward portion of the pressure chamber 21. This forward motion of the ram is illustrated by the arrow 72 in FIG. 4 and the retraction by the arrow 73 in FIG. 3.

During this forward motion 72 of the ram 22 the meat is forced through the restricted flow passage 58 and flows into the mold opening 26 in the wave formation shown in FIG. 4. Then during the retraction 73 of the ram 22 the mold plate 25 is projected forwardly as illustrated by the arrow 74 into the patty removal position of FIG. 1 where the patties 24 are removed by the knockout device 23.

Each fill slot 33 is shaped so as to follow closely the adjacent configuration of the mold opening 26. In the illustrated embodiment the mold opening, of course, is circular.

Various theories are expressed herein, but the invention is not limited to any theory as these are given only as an aid to understanding the invention.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A device for molding food articles of raw finely divided beef and similar tissue containing food material that is normally subject to uneven shrinkage during cooking, comprising: supply means for said material; a pressure chamber means for providing pressurized said food material; a mold having a mold opening defined by a peripheral arcuate edge surface and spaced opposite planar end surfaces; means for moving said mold to and from a filling position for said mold opening; and supply passage means for supplying said pressurized food material to said mold opening when said mold and opening are in mold filling position to form said articles, said supply passage means comprising a flow channel located above the mold plate and above an adjacent edge portion of said mold opening when said mold is in said filling position and having an arcuate exit end at said arcuate edge of said mold opening, said arcuate exit end of said supply passage including means for projecting said food material directly into said mold opening in a thin ribbon of a thickness that is a fraction of the spacing between said mold opening end surfaces, said thin ribbon during said projecting being at an obtuse angle to an adjacent one of said planar end surfaces that defines, with said arcuate edge surface, said mold opening.

2. The device of claim 1 wherein said mold comprises a flat plate with the mold opening extending therethrough and there are provided means for reciprocating said mold plate between said filling position and an external emptying position for said mold opening, and confining members between which said mold plate is held during said reciprocation, said confining members defining said end surfaces of said mold opening.

3. The device of claim 2 wherein a first said confining member is located adjacent to said supply means and contains said arcuate exit end of said supply passage.

4. The device of claim 1 wherein said arcuate exit end of said supply passage comprises successive first and second angularly arranged passage portions producing an additive effect on said thin ribbon of food material projecting the ribbon at said obtuse angle to said end surface.

5. The device of claim 1 wherein said exit end comprises passage means emptying into said mold opening in a passage direction substantially parallel to said arcuate edge of said mold opening.

6. The device of claim 5 wherein said passage means is stepped.

7. The device of claim 1 wherein said mold opening is substantially circular to produce a circular food patty, said exit comprises arcuate first and second extending portions adjacent to said mold opening and curved to substantially the same radius as said mold opening and the centers of said curvature for said first and second portions are spaced from each other.

8. The device of claim 7 wherein said exit end comprises stepped passage means emptying into said mold opening in a passage direction substantially parallel to said arcuate edge of said mold opening.

9. The device of claim 7 wherein said spacing is about 0.04 to 0.08 times the diameter of said patty.

10. The device of claim 7 wherein said spacing is about 0.06 times the diameter of said patty.

11. The device of claim 1 wherein said radius of curvature is about 0.52 to 0.60 times the diameter of the patty.

12. The device of claim 1 wherein the longitudinal width of said fill slot is about 0.7 to 0.9 times the diameter of the patty.

13. The device of claim 1 wherein said radius of curvature is about 0.56 times the diameter of the patty.

* * * * *